(12) United States Patent
Sajedi

(10) Patent No.: US 11,747,126 B1
(45) Date of Patent: Sep. 5, 2023

(54) ULTRA-LIGHT AND ULTRA-ACCURATE PORTABLE COORDINATE MEASUREMENT MACHINE WITH REDUCED PROFILE SWIVEL JOINTS

(71) Applicant: SA08700334, Grand Cayman (KY)

(72) Inventor: Allen Sajedi, Orlando, FL (US)

(73) Assignee: SA08700334, Grand Cayman (KY)

( * ) Notice: Subject to any disclaimer, the term of this patent is extended or adjusted under 35 U.S.C. 154(b) by 0 days.

(21) Appl. No.: 17/750,038

(22) Filed: May 20, 2022

(51) Int. Cl.
*G01B 5/008* (2006.01)

(52) U.S. Cl.
CPC .................................... *G01B 5/008* (2013.01)

(58) Field of Classification Search
CPC ...................................................... G01B 5/008
USPC .............................................................. 33/503
See application file for complete search history.

(56) References Cited

U.S. PATENT DOCUMENTS

| | | | |
|---|---|---|---|
| 4,888,877 A | 12/1989 | Enderle et al. | |
| 5,408,754 A | 4/1995 | Raab | |
| 5,596,189 A | 1/1997 | Orton | |
| 5,611,147 A | 3/1997 | Raab | |
| 5,829,148 A | 11/1998 | Eaton | |
| 6,170,358 B1 | 1/2001 | Hunter et al. | |
| 6,219,928 B1 | 4/2001 | Raab et al. | |
| 6,374,198 B1 | 4/2002 | Schifa et al. | |
| 6,519,860 B1 | 2/2003 | Bieg et al. | |
| 6,892,465 B2 | 5/2005 | Raab et al. | |
| 6,920,697 B2 | 7/2005 | Raab et al. | |
| 6,931,745 B2 * | 8/2005 | Granger | G01B 5/008 33/503 |
| 6,935,036 B2 | 8/2005 | Raab et al. | |
| 6,957,496 B2 | 10/2005 | Raab et al. | |
| 6,965,843 B2 | 11/2005 | Raab et al. | |
| 6,988,322 B2 | 1/2006 | Raab et al. | |
| 7,050,930 B2 | 5/2006 | Raab et al. | |
| 7,051,450 B2 | 5/2006 | Raab et al. | |

(Continued)

FOREIGN PATENT DOCUMENTS

WO     2018/191632     10/2018

OTHER PUBLICATIONS

P.A. Orton et al., Automatic Self-Calibration of an Incremental Motion Encoder, IEEE Instrument and Measurement Technology Conference, Budapest, Hungary, May 21-23, 2001, at 1614.

(Continued)

*Primary Examiner* — George B Bennett
(74) *Attorney, Agent, or Firm* — Renner, Otto, Boisselle & Sklar, LLP

(57) ABSTRACT

A coordinate measurement machine (CMM) may include a manually-positionable articulated arm including arm segments and rotary joints. A swivel joint may include two or more bearings, a shaft coupled to an inner race of the first bearing and an inner race of the second bearing, a first housing coupled to an outer race of the first bearing, and a second housing coupled to an outer race of the second bearing. The second housing is not directly connected to the first housing. The swivel joint may also include an inner spacer coupled to the inner race of the first bearing and the inner race of the second bearing and an outer spacer coupled to the outer race of the first bearing and the outer race of the second bearing. Most of an outer surface of the outer spacer may be exposed to form a portion of the housing of the CMM.

20 Claims, 13 Drawing Sheets

(56) References Cited

U.S. PATENT DOCUMENTS

| | | | |
|---|---|---|---|
| 7,069,664 B2 | 7/2006 | Raab et al. | |
| 7,073,271 B2 | 7/2006 | Raab et al. | |
| 7,246,030 B2 | 7/2007 | Raab et al. | |
| 7,269,910 B2 | 9/2007 | Raab et al. | |
| 7,430,068 B2 | 9/2008 | Becker et al. | |
| 7,519,493 B2 | 4/2009 | Atwell et al. | |
| 7,624,510 B2 * | 12/2009 | Ferrari | G01B 21/04 33/503 |
| 7,735,234 B2 | 6/2010 | Briggs et al. | |
| 7,743,524 B2 | 6/2010 | Eaton et al. | |
| 7,774,949 B2 | 8/2010 | Ferrari | |
| 7,797,849 B2 * | 9/2010 | Gomez | G01B 5/14 33/503 |
| RE42,055 E | 1/2011 | Raab et al. | |
| 7,881,896 B2 | 2/2011 | Atwell et al. | |
| 7,954,250 B2 * | 6/2011 | Crampton | G01B 21/047 33/503 |
| 8,015,721 B2 | 9/2011 | Eaton et al. | |
| 8,122,610 B2 | 2/2012 | Tait et al. | |
| 8,145,446 B2 | 3/2012 | Atwell et al. | |
| 8,336,220 B2 | 12/2012 | Eaton et al. | |
| 8,402,669 B2 | 3/2013 | Ferrari et al. | |
| 8,595,948 B2 | 12/2013 | Raab et al. | |
| 8,699,007 B2 | 4/2014 | Raab et al. | |
| 8,719,474 B2 | 5/2014 | Becker et al. | |
| 8,931,182 B2 | 1/2015 | Raab et al. | |
| 8,997,362 B2 | 4/2015 | Briggs et al. | |
| 9,069,355 B2 * | 6/2015 | Tait | G05D 1/0268 |
| 9,234,773 B2 | 1/2016 | Cramer | |
| 9,410,787 B2 | 8/2016 | Raab et al. | |
| 9,423,282 B2 | 8/2016 | Moy | |
| 9,513,100 B2 | 12/2016 | Raab et al. | |
| 9,651,361 B2 * | 5/2017 | York | G01B 21/04 |
| 9,759,540 B2 * | 9/2017 | Ferrari | G01B 15/08 |
| 9,803,973 B1 | 10/2017 | Sajedi | |
| 10,215,548 B2 | 2/2019 | Sajedi | |
| 10,228,228 B2 | 3/2019 | Sajedi | |
| 10,267,614 B2 | 4/2019 | Sajedi | |
| 11,045,944 B2 * | 6/2021 | Phipps | G01B 21/045 |
| 11,287,241 B2 | 3/2022 | Phipps et al. | |
| 2003/0167647 A1 | 9/2003 | Raab et al. | |
| 2011/0173825 A1 | 7/2011 | Danielson et al. | |
| 2015/0219452 A1 | 8/2015 | Bridges et al. | |
| 2016/0084633 A1 | 3/2016 | Ferrari et al. | |
| 2018/0216923 A1 | 8/2018 | Creachbaum et al. | |
| 2019/0249974 A1 | 8/2019 | Sajedi | |

OTHER PUBLICATIONS

Zhao, Huining & Yu, Lian-Dong & Jia, Hua-Kun & Li, Weishi & Sun, Jin-Qi. (2016), A New Kinematic Model of Portable Articulated Coordinate Measuring Machine, Applied Sciences, 6, 181, 10.3390/app6070181.

* cited by examiner

ULTRA-LIGHT AND ULTRA-ACCURATE PORTABLE COORDINATE MEASUREMENT MACHINE WITH REDUCED PROFILE SWIVEL JOINTS

BACKGROUND

The present disclosure relates generally to a coordinate measuring machine and more particularly to a high accuracy, ultra-lightweight portable coordinate measuring machine.

Coordinate measurement machines serve to, among other things, measure points in a three-dimensional space. Coordinate measuring machines trace the measuring points in Cartesian coordinate space (x, y, z), for example. Coordinate measuring machines typically consist of a stand and a tracing system. The stand may serve as a reference point relative to which the tracing system moves in the space in a measurable manner. The tracing system for a portable coordinate measuring machine may include an articulated arm attached to the stand at one end and a measurement probe at the other end.

For the measurement to be useful, it must be accurate. Very high accuracy, however, is difficult to achieve because of factors such as temperature and load conditions. Particularly in portable coordinate measuring machines, warping of the arm caused by thermal changes or by changes in loads has a negative effect on the measurement's accuracy. Consequently, in terms of their performance, conventional portable coordinate measuring machines lacked accuracy because, among other things, they lacked rigidity.

Accuracy improvements may be available. Conventionally, however, such improvements came accompanied by significant increases in mass and/or weight of the coordinate measuring machine. Conventional portable coordinate measuring machines of improved accuracy were bulky and heavy. These are undesirable characteristics for coordinate measuring machines, particularly portable coordinate measuring machines. Moreover, processes for constructing and assembling coordinate measuring machines' joints, particularly long joints, with the required precision to obtain accurate measurements have not been available.

SUMMARY OF THE INVENTION

The present disclosure provides a portable coordinate measurement machine (CMM) that is more accurate than prior art coordinate measuring machines. Remarkably, the CMM disclosed herein is also lighter and less bulky.

In an aspect of the invention, the CMM disclosed herein includes a novel swivel joint. The swivel joint may include spacers placed between the bearings to keep proper spacing between them and, more importantly, to set and preserve preload, which improves rigidity and, hence, measurement precision compared to, for example, dead weight preload or spring preload. An outer spacer may be disposed abutting the outer race of the first bearing and an outer race of the second bearing and an inner spacer may be disposed abutting the inner race of the first bearing and the inner race of the second bearing. A majority of an outer surface of the outer spacer may be exposed as to represent an outermost layer of the at least one of the swivel joints. That is, a majority of the outer surface of the outer spacer may be exposed as to form part of the CMM's housing. When compared with prior CMM, the swivel joint disclosed herein is significantly smaller (because there is no need for additional housing components), lighter (easier to transport), and aesthetically superior. This swivel joint design is also more rigid, which may reduce flexing or deformation of the CMM and, thus, improve the CMM's accuracy.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1A:
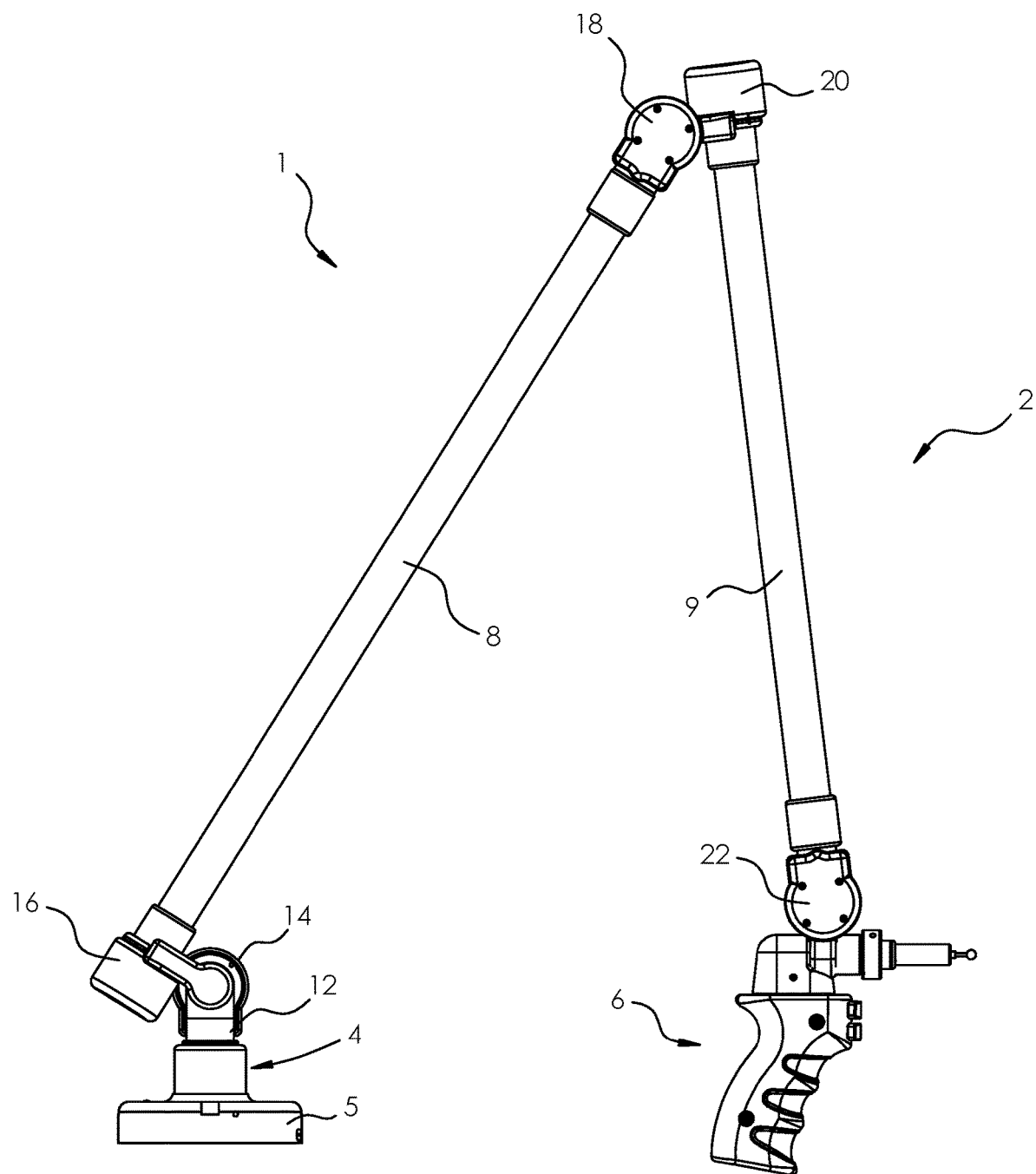
FIGS. 1A-1C illustrate perspective views of an exemplary coordinate measuring machine (CMM).
Figure 1B:
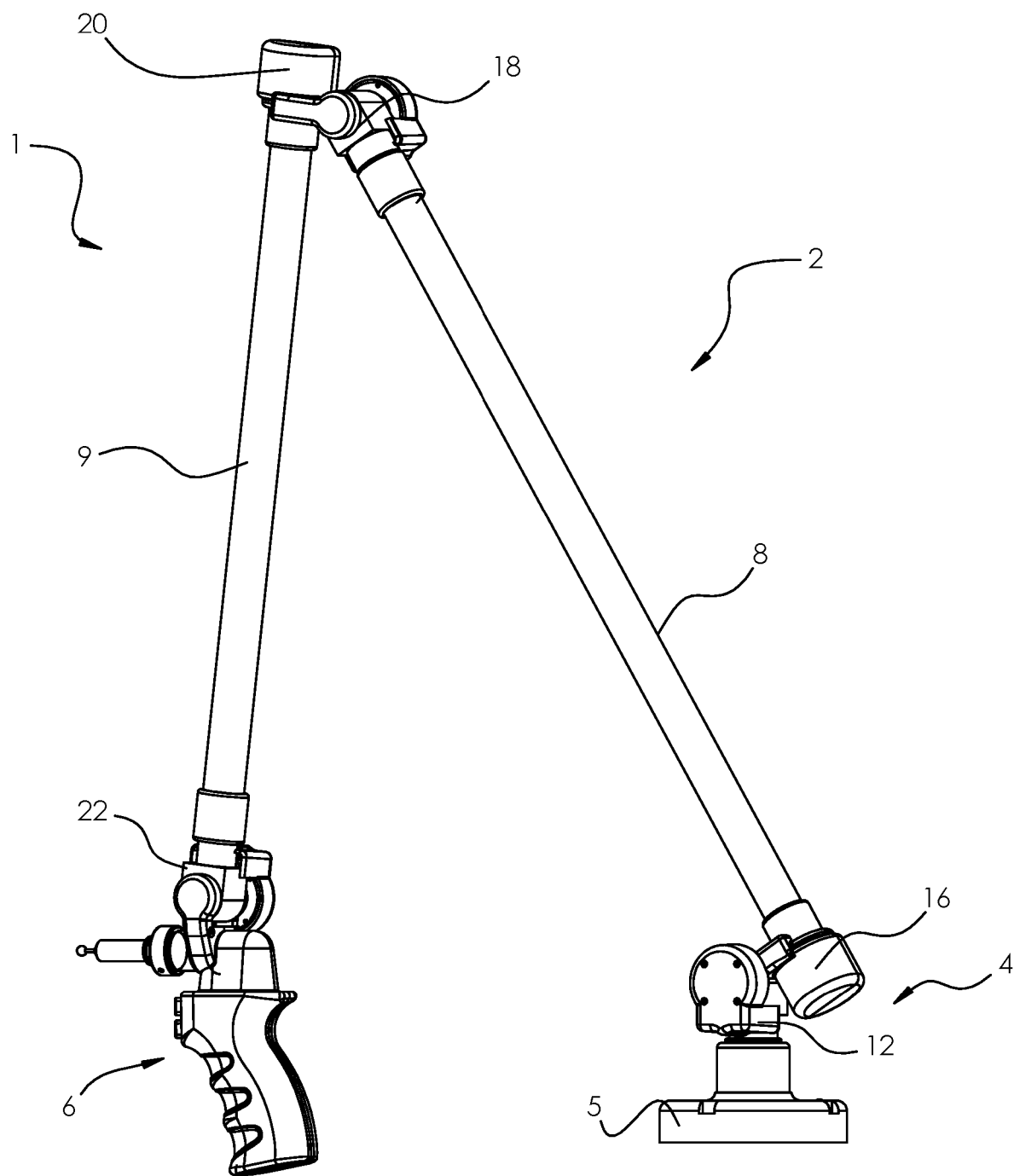
Figure 1C:
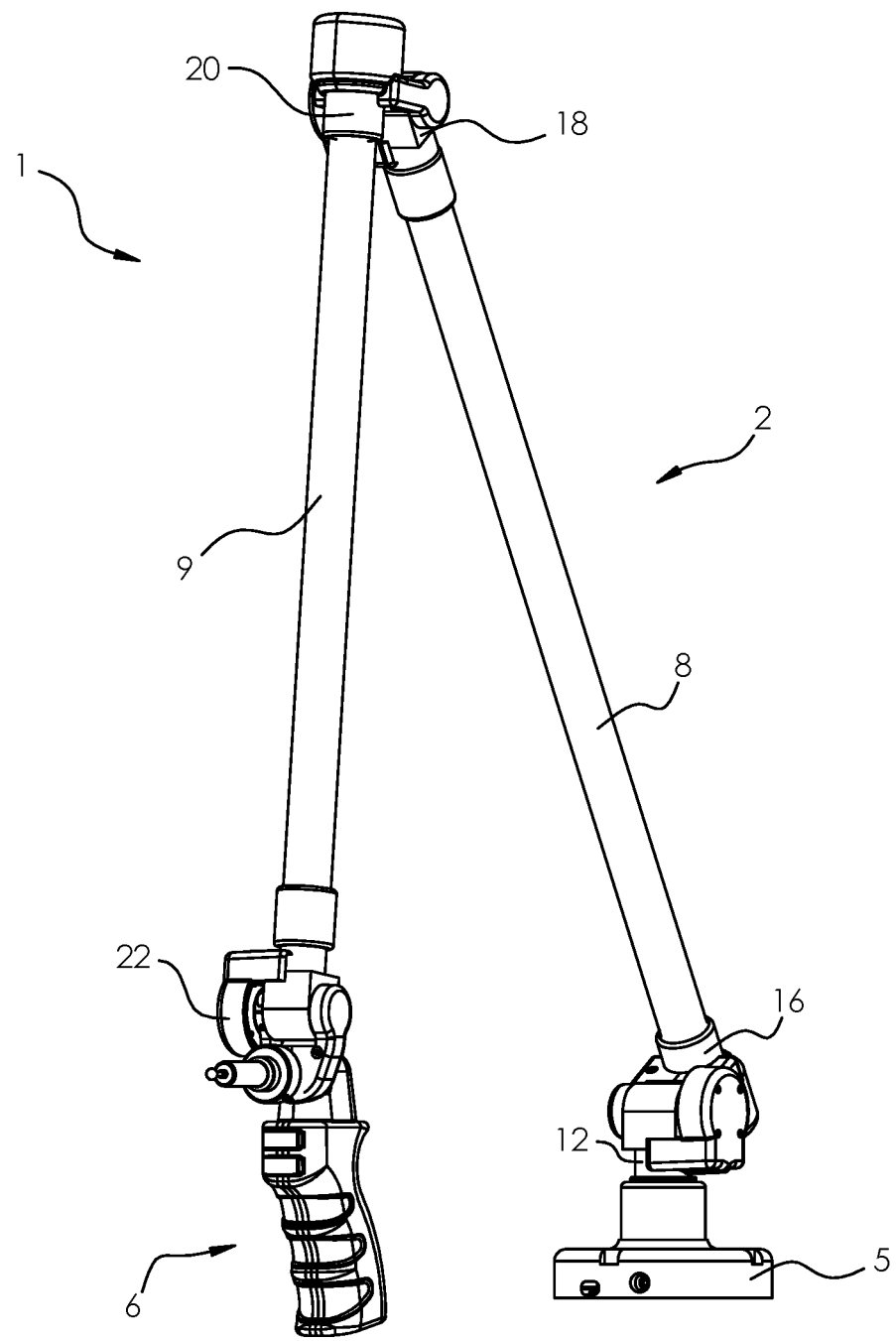
Figure 1D:
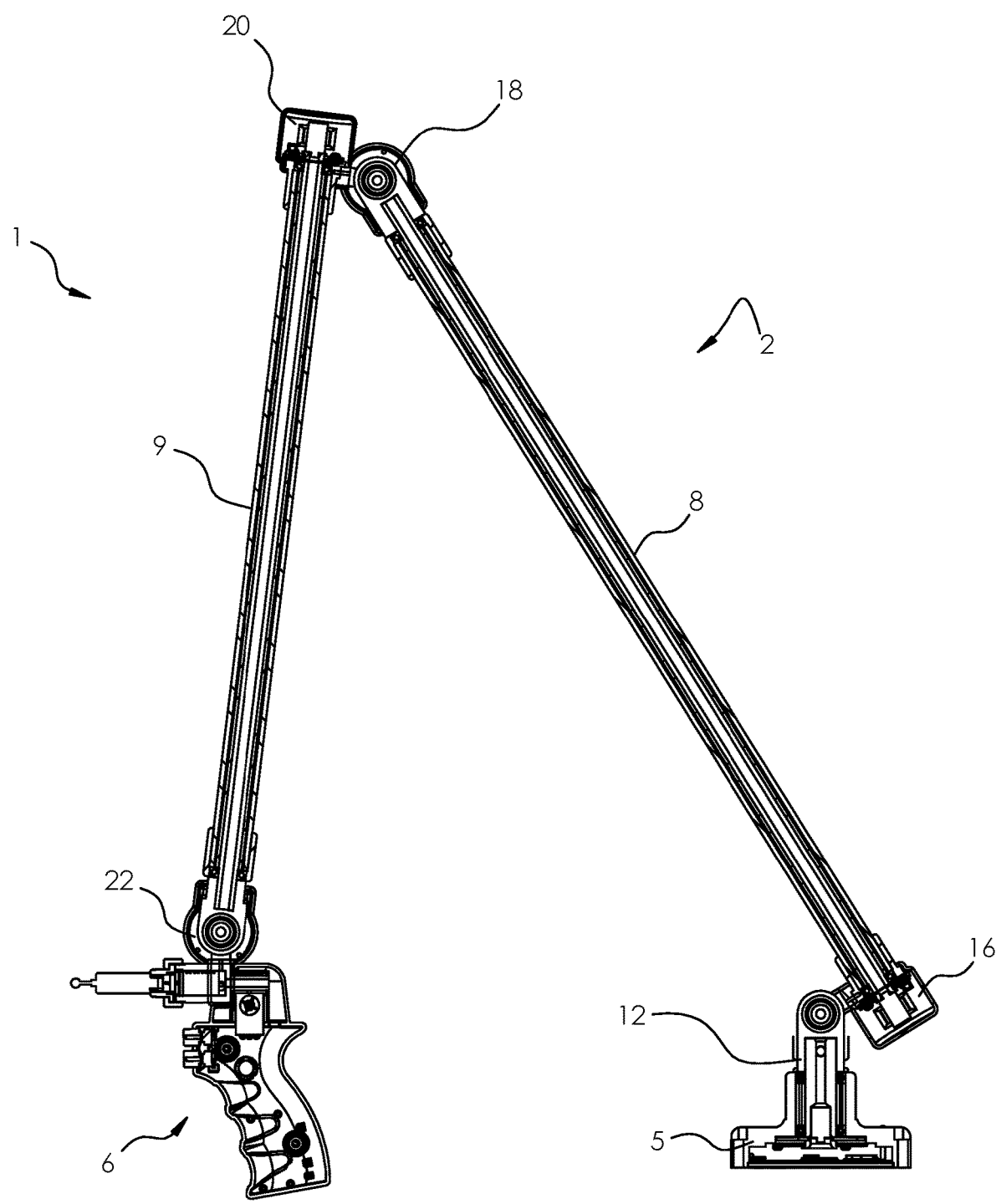
FIG. 1D illustrates a cross-sectional view of the exemplary CMM of FIGS. 1A-1C.

FIGS. 1A-1C illustrate perspective views of an exemplary coordinate measuring machine (CMM) 1. FIG. 1D illustrates a cross-sectional view of the exemplary CMM 1. CMM 1 includes an articulated arm 2, a base 4, and a measurement probe 6. The articulated arm 2 is attached at one end to the base 4 and at the other end to the measurement probe 6. The base 4 may be attached to, for example, a base plate 5 to attach the arm 2 to, for example, a working surface. Articulated arm 2 includes two arm segments 8, 9 and a number of rotary joints 12, 14, 16, 18, 20, 22, 24.

The overall length of articulated arm 2 and/or the arm segments 8, 9 may vary depending on its intended application. In one embodiment, the articulated arm may have an overall length of about 48 inches. This arm dimension provides a portable CMM which is well suited for measurements now accomplished using typical hand tools such as micrometers, height gages, calipers, and the like. Articulated arm 2 could have smaller or larger dimensions.

The rotary joints generally include two types of joints, swivel joints 12, 16, 20 and hinge joints 14, 18, 22. The swivel joints 12, 16, 20 are positioned generally axially or longitudinally along the arm 2. The hinge joints 14, 18, 22 are positioned generally at 90° to the swivel joints or 90° to the longitudinal axis of the arm 2. The swivel and hinge joints are generally paired up as shown in FIGS. 1A-1D, but the joints may be arranged in other configurations. Because of the multiple rotary joints, the arm 2 is manually-positionable meaning that a user is free to manually move the probe 6 to virtually any position within a radius anchored at the base 4 of the CMM 1. Each of these joints are generally shown in FIGS. 2A-5C.

In general, the base plate 5 of the base 4 attaches the CMM 1 to a working surface, the base 4 attaches to the swivel joint 12, which attaches to the hinge joint 14, which attaches to the swivel joint 16, which attaches to the hinge joint 18, which attaches to the swivel joint 20, which attaches to the hinge joint 22, which attaches to the measurement probe 6.

Figure 2A:
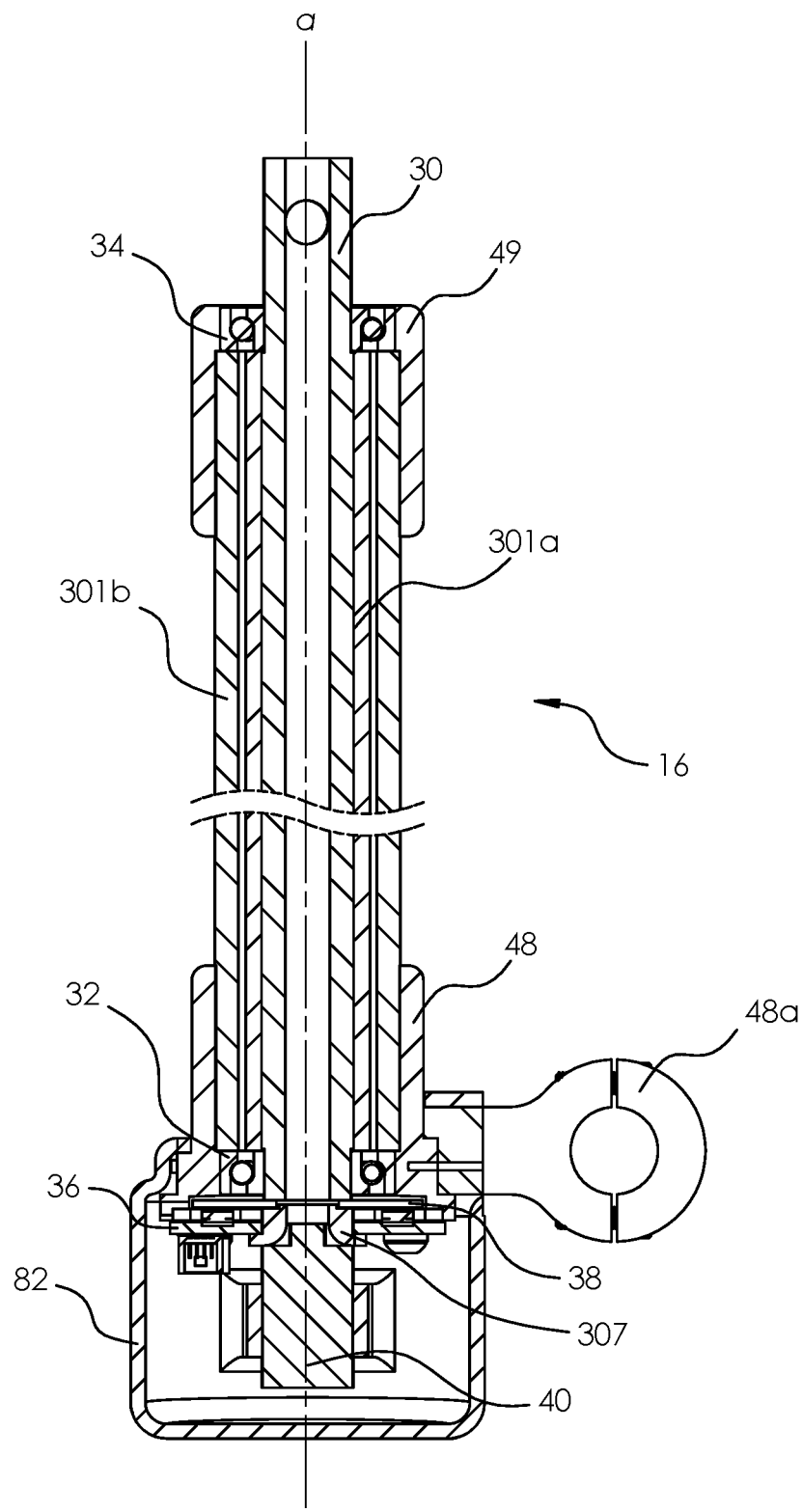
FIGS. 2A and 2B illustrate cross-sectional and partial exploded views, respectively, of an exemplary swivel joint of the CMM of FIGS. 1A-1D.
Figure 2B:
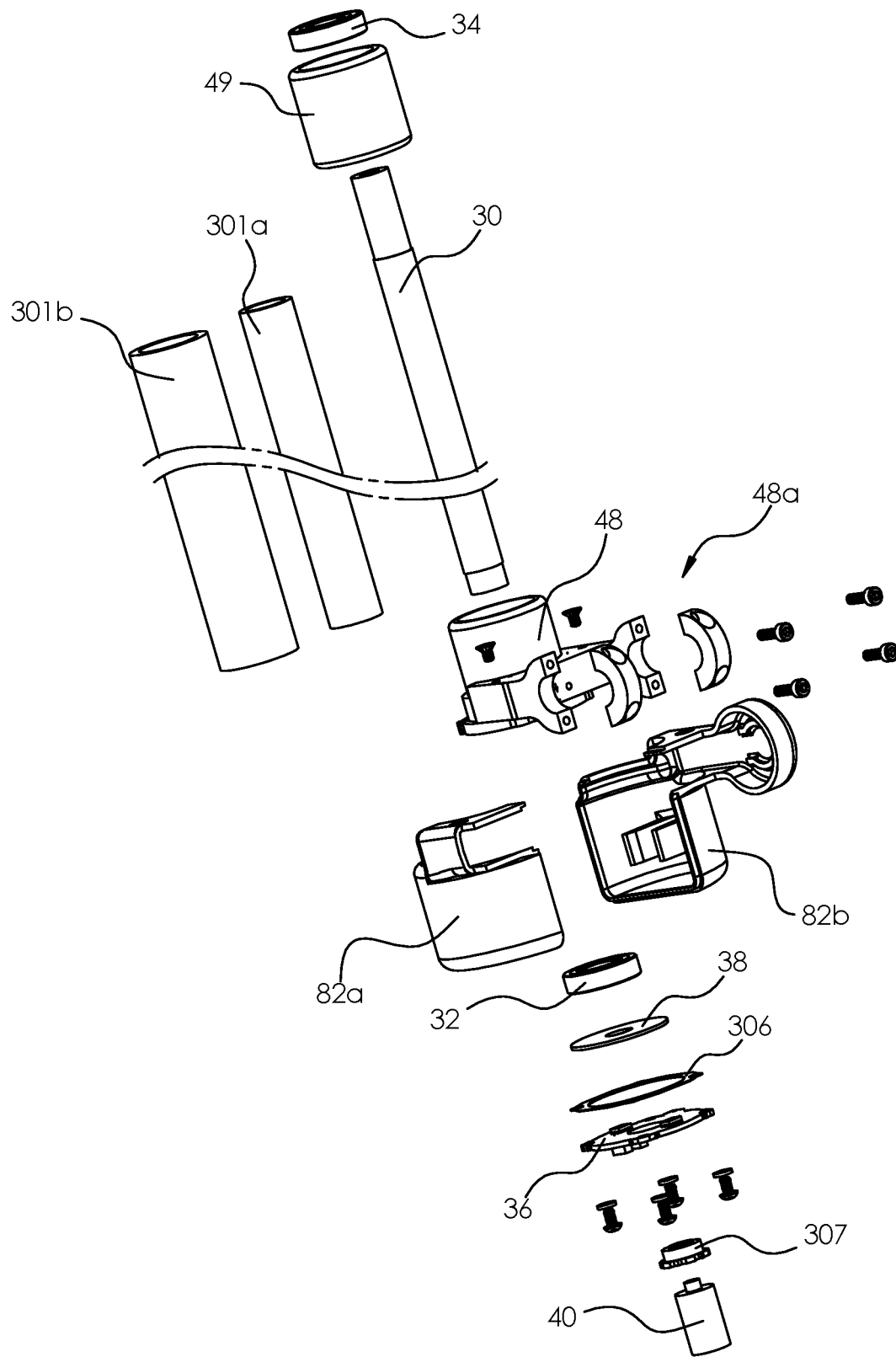

FIG. 2A illustrates a partial cross-sectional view of swivel joint 16 while FIG. 2B illustrates a partial exploded view of exemplary swivel joint 16. Each of the figures illustrates only the ends of the swivel joint 16; the middle portion of the swivel joint not illustrated corresponds to the arm segment 8. The swivel joint 16 will be used here to describe swivel joints 12, 16, 20 in general even though the swivel joints may not be identical. The swivel joints 16 and 20 are very similar.

The swivel joint 16 may include housings 48, 49, shaft 30, bearings 32, 34, spacers 301a, 301b, encoder PCB 36, encoder disk 38, and slip ring 40. The bearings 32, 34 are preferably steel or stainless-steel ball bearings. The shaft 30, being relatively long, may be fabricated of rigid yet relatively lighter material such as, for example, carbon fiber, aluminum, etc. as well as from steel. In one embodiment, the shaft 30 may be fabricated of steel or ceramic to match the material from which the bearings 32, 34 are fabricated. Similar to the relatively long shaft 30, the spacers 301a, 301b may be tubes fabricated of the same rigid yet relatively light material as shaft 30 including from carbon fiber, ceramic, or steel.

At one end of the swivel joint 16, the housing 48 has a port within which an end of the shaft 30 resides and a yoke 48a that operably connects the swivel joint 16 to the previous hinge joint (see FIGS. 1A-1 D). In the case of swivel joint 16, the yoke 48a has two projections that connect the swivel joint 16 to the shaft of the hinge joint 14. At the other end of the swivel joint 16, the housing 49 has a port within which an end of the shaft 30 resides.

As may be best seen in FIG. 2A, at one end of the swivel joint 16, the inner diameter of the port of the housing 48 engages (e.g., fixedly attaches to) the outer diameter or outer race of the bearing 32. The port of the housing 48 may, for example, be glued to the outer diameter or outer race of the bearing 32. The shaft 30, for its part, has an outer diameter that engages (e.g., is fixedly attached to) the inner diameter or inner race of the bearing 32. The shaft 30 may, for example, be glued to the inner diameter or inner race of the bearing 32. At the other end of the swivel joint 16, the inner diameter of the port of the housing 49 engages (e.g., fixedly attaches to) the outer diameter or outer race of the bearing 34. The port of the housing 49 may, for example, be glued to the outer diameter or outer race of the bearing 34. The shaft 30, for its part, has an outer diameter that engages (e.g., is fixedly attached to) the inner diameter or inner race of the bearing 34. The shaft 30 may, for example, be glued to the inner diameter or inner race of the bearing 34. The shaft 30, therefore, rotates about the axis of rotation a of the bearings 32 and 34 and the housings 48 and 49.

The PCB 36 of the swivel joint 16 has installed thereon at least one transducer configured to output an angle signal corresponding to an angle of rotation of the shaft 30 relative to the housing 48, 49 about the axis of rotation a. Each transducer comprises an optical encoder that has two primary components, one or more read heads and the encoder disk 38. The encoder disk 38 may be operably attached to an end of the shaft 30 (e.g., using a suitable adhesive) spaced from and in alignment with read heads on PCB 36, which is operably attached to the housing 48 (e.g., using fasteners and/or a suitable adhesive). The locations of disk 38 and the read heads may be reversed whereby disk 38 may be operably attached to housing 48 and the read heads rotate with shaft 30 so as to be rotatable with respect to each other while maintaining optical communication. Encoders are commercially available from, for example, Celera Motion under trade names such as MicroE encoders. Each PCB 36 may additionally include a processor for receiving angle signals from the read heads, and a transceiver and connector for connecting the PCB 36 to the communication bus of the CMM 1 and/or other wiring. Each of the PCB 36 may also include a temperature sensor connected to the processor to provide for thermal compensation due to room temperature variation.

A Kapton film 306 may be located between the PCB 36 and housing 48 for electrical isolation. A plastic cap 307 may be glued to the center hole of PCB 36 to seal the cavity between PCB 36 and Encoder Disk 38 to protect from dust contamination.

The cover 82 operably attaches to the housing 48 to cover wiring harness and seal the PCB 36 and encoder disk 38 from dust contamination. The cover 82 may be divided into two parts 82a and 82b that come together and operably attach to the housing 48. The cover portion 82b has a portion that covers a portion of the yoke 48a that protrudes to operably connect the swivel joint 16 to the hinge joint 14.

Swivel joint 16 (as well as other joints in CMM 1) may have unlimited rotation, meaning that it may rotate 360° about its axis of rotation a. Thus, slip ring 40 is used and provides unlimitedly rotatable electrical connections to swivel joint 16. Shafts used herein in swivel joints such as the shaft 30 of base swivel joint 12 and the shaft 30 of swivel joint 16 may be hollow (i.e., have an axial opening). Shafts used herein in hinge joints such as the shaft 80 of hinge joint 18 described below may also be hollow and may also include an aperture (see FIG. 3A).

The swivel joint 16 of arm segment 8 is a relatively long joint as may be appreciated from FIGS. 1A-1D. In one embodiment, the shaft 30 is at least 6 inches long. Such long joints were conventionally problematic because, as explained in detail in U.S. Pat. No. 10,267,614 (hereby incorporated by reference in its entirety), improved precision required concentricity between the bearing bores in housings 48 and 49. The prior art (see, for example, U.S. Pat. No. 10,267,614, FIG. 3C) used special fixtures to align those bores for improved concentricity. This process was tedious and left room for further concentricity improvements. Also, the prior art (see, for example, U.S. Pat. No. 10,267,614, FIG. 3E) applied bearing preload using dead weight or spring washers which also left room for further improvement. Swivel joint 16 uses a novel and unique construction that addresses these problems.

The swivel joint 16 may include the spacers 301a, 301b that, because of the unique construction of the swivel joint 16, may play dual roles as spacers (responsible for maintaining proper distance and preload between the bearings 32, 34) and as housing or outer most layer of the CMM 1. The unique design resolves the concentricity problem in the prior art because it provides a rigid and concentric swivel joint bearing assembly incorporating the bearings 32, 34 and the spacers 301. The unique design involving the spacers 301 also provides improvements in bearing preload.

In the illustrated embodiment, the inner spacer 301a is a tubular spacer disposed abutting the inner race of the first bearing 32 and the inner race of the second bearing 34 while the outer spacer 301b is a tubular spacer disposed abutting the outer race of the first bearing 32 and an outer race of the second bearing 34. The spacers 301a and 301b are matched and precisely lapped to maximize precision of the structure formed by the spacers 301a, 301b, and bearings 32, 34. Moreover, as shown in FIG. 2A, a majority of the outer surface of the outer spacer 301b is exposed (i.e., no additional cladding over the spacer 301b) and, therefore, the outer surface of the outer spacer 301b is the outermost layer of the swivel joint 16. This means that the outer surface of the outer spacer 301b forms part of the housing of the CMM 1.

Because of the outer surface of the outer spacer 301b is part of the housing of the CMM 1, no additional fixturing is necessary. Plus, spacers 301a and 301b add rigidity to the swivel joint bearing assembly of the CMM 1 when compared to conventional CMM, which reduces bending/flexing and, thus, increases rigidity and ultimately accuracy. In part because of this unique design, the CMM 1 achieves significantly better accuracy than prior art portable coordinate measurement machines.

Figure 3A:
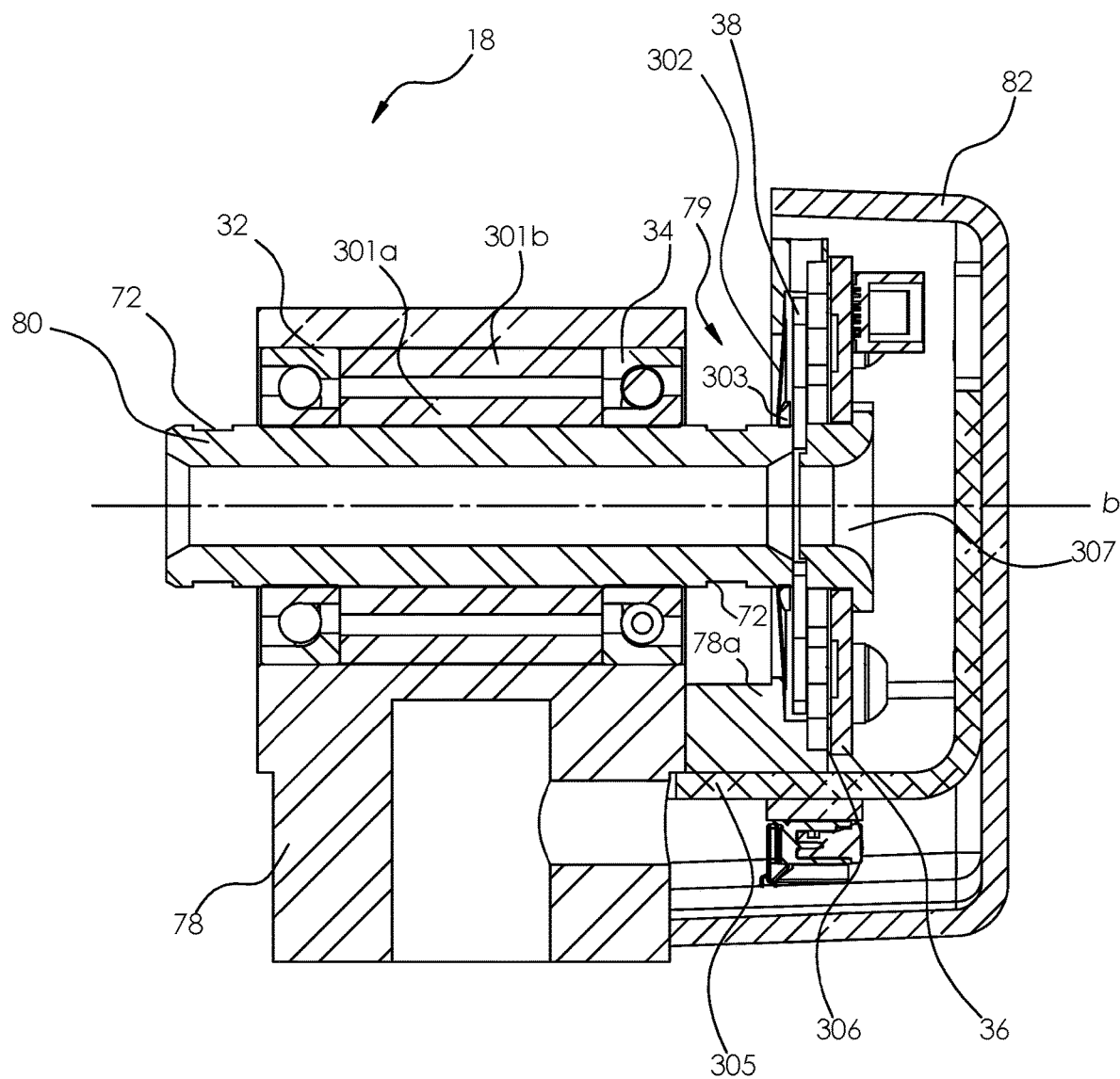
FIGS. 3A and 3B illustrate cross-sectional and partial exploded views, respectively, of a hinge joint of the CMM of FIGS. 1A-1D.
Figure 3B:
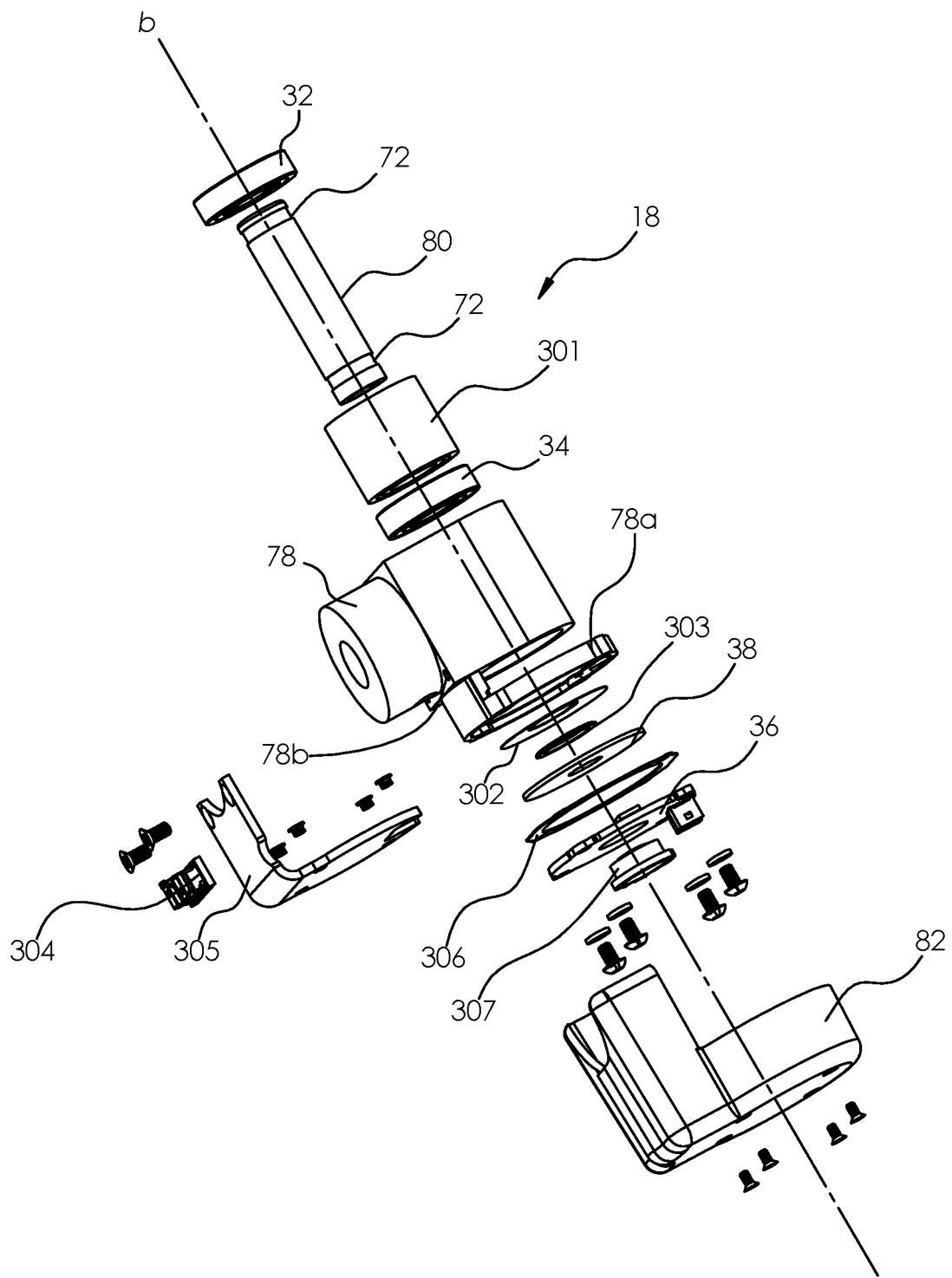

FIG. 3A illustrates a cross-sectional view of hinge joint 18 while FIG. 3B illustrates an exploded view of exemplary hinge joint 18. The hinge joint 18 will be used here to describe hinge joints 14, 18, 22 in general even though the hinge joints may not be identical. At least some of the components of hinge joint 18 are substantially similar to components discussed in detail above in reference to swivel joints 12 and 16 and thus these similar components are identified in FIGS. 3A and 3B with the same reference designators as in the previous figures.

The hinge joint 18 may include housing 78, shaft 80, bearings 32, 34, spacers 301a, 301b, encoder PCB 36, and encoder disk 38. As may be best seen in FIG. 3A, the housing 78 has a port that engages (e.g., fixedly attaches to) the outer diameters or outer races of the bearings 32, 34. The port of the housing 78 may, for example, be glued to the outer diameter or outer race of the bearings 32 and 34. The shaft 80, for its part, has an outer diameter that engages (e.g., is fixedly attached to) the inner diameter or inner race of the bearings 32, 34. The shaft 80 may, for example, be glued to the inner diameter or inner race of the bearings 32, 34. The shaft 80, therefore, rotates about the axis of rotation b of the bearings 32, 34 and the housing 78 of the hinge joint 18.

The spacers 301a, 301b may be tubes fabricated of the same rigid yet relatively light material as shaft 80 including from carbon fiber, ceramic, or steel. Spacers 301a, 301b may be placed between the bearings 32, 34 to keep proper spacing between them and, more importantly, to set and preserve preload. In the illustrated embodiment, the inner spacer 301a is a tubular spacer disposed abutting the inner race of the first bearing 32 and the inner race of the second bearing 34 while the outer spacer 301b is a tubular spacer disposed abutting the outer race of the first bearing 32 and an outer race of the second bearing 34. The spacers 301a and 301b are matched and precisely lapped to maximize precision of the structure formed by the spacers 301a, 301b, and bearings 32, 34.

The shaft 80 is configured to engage a yoke of an adjacent swivel joint such as the yoke 48a of swivel joint 20. In the illustrated embodiment, the shaft 80 has grooves 72 machined or otherwise formed thereon to create a gap (e.g., 5 mils or 127 µm) for better bonding of adhesive with the yoke of an adjacent swivel joint such as the yoke 48a of swivel joint 16. The housing 78 has built or welded or otherwise installed thereon a housing bracket 78a that creates a gap 79 in the housing 78 for one of the projections of the yoke to engage the shaft 80 such that the two projections of the yoke straddle the bearings 32, 34 therebetween.

The encoder cavity dust seal washer 302 is held in place by the inside of the bracket 78a and the washer 303 that is glued to shaft 80. The plastic cap 307 is glued to the center hole of the encoder board 36. Dust seal washer 302 and plastic cap 307 seal the encoder cavity (inside of the bracket 78a) from dust contaminants from each end.

Similar to the swivel joints discussed above, the PCB 36 of the hinge joint 18 has installed thereon at least one transducer configured to output an angle signal corresponding to an angle of rotation of the shaft 80 relative to the housing 78 about the axis of rotation b. As discussed above, each transducer comprises an optical encoder that has two primary components, one or more read heads and the encoder disk 38. In the illustrated embodiment, the encoder disk 38 is operably attached to an end of the shaft 80 (e.g., using a suitable adhesive) spaced from and in alignment with the read heads on PCB 36, which is operably attached to the housing 78 (e.g., using fasteners and/or a suitable adhesive). The locations of disk 38 and the read heads may be reversed whereby disk 38 may be operably attached to housing 78 and the read heads rotate with shaft 80 so as to be rotatable with respect to each other while maintaining optical communication. As best shown in FIG. 3A, the PCB 36 and the encoder disk 38 are located adjacent an end of the shaft 80 separated away from bearing 34 by gap 79. This is different from previous hinge joints in which the PCB 36 and the encoder disk 38 may have resided between ends of the shaft 80, between the bearings 32, 34 (see, for example, U.S. Pat. No. 11,287,241, FIG. 16D). In the illustrated embodiment, the PCB 36 and the encoder disk 38 are located outside of the yoke of the adjoining swivel joint, not between the bearings 32, 34, and spaced apart from the bearing 34 by the gap 79 for one of the projections of the yoke to engage the shaft 80.

The PCB 36 and the encoder disk 38 being located near the end of the shaft 80, not inside the housing 78 between the bearings 32, 34 may expose the encoder disk 38, the read heads, etc. to external loads such as, for example, a user who may rest his hand against the joint 18 and specifically the plastic cover 82. This may introduce angle measurement errors. To protect against such external loads, the joint 18 may also include a bracket 305 that may be fabricated from aluminum, steel, etc. and mounted to the housing 78. As shown in FIG. 3B, the housing 78 may have formed thereon threaded holes 78b to match holes in the protector bracket 305 so that the bracket 305 may be mounted to the housing 78 using screws. As seen in FIG. 3A, the bracket 305 protects the PCB 36 and the encoder disk 38 from external loads. The joint 18 may further include the cover 82 that operably attaches to the housing 78 to cover the wiring harness and seal the PCB 36 and encoder disk 38 from dust. The cover 82 may have screw holes formed thereon to match threaded holes in the bracket 305 to attach the cover 82 to the bracket 305 using screws.

Unlike prior art hinge joints, in which the electronics were buried inside structural elements of the CMM's joints (see, for example, U.S. Pat. No. 11,287,241 FIG. 16D), the hinge joint 18 and specifically the PCB 36 and other electronics (e.g., wiring harness) may be easily serviced by removing the cover 82. When compared with prior art CMM, the hinge joint 18 is significantly smaller because there is no need for space to fit the encoder PCB 36 between the bearings 32, 34, lighter, easier to transport, and aesthetically superior. This design allows use of spacer 301 in hinge joint 18 compared to the prior art (see, for example, U.S. Pat. No. 10,267,614, FIG. 5B) where applied bearing preload deforms the yoke and misaligns the outer races of bearing 32 and 34. As a result hinge joint 18 is more rigid, which may reduce flexing or deformation and, thus, improve the CMM's measuring accuracy.

Figure 4A:
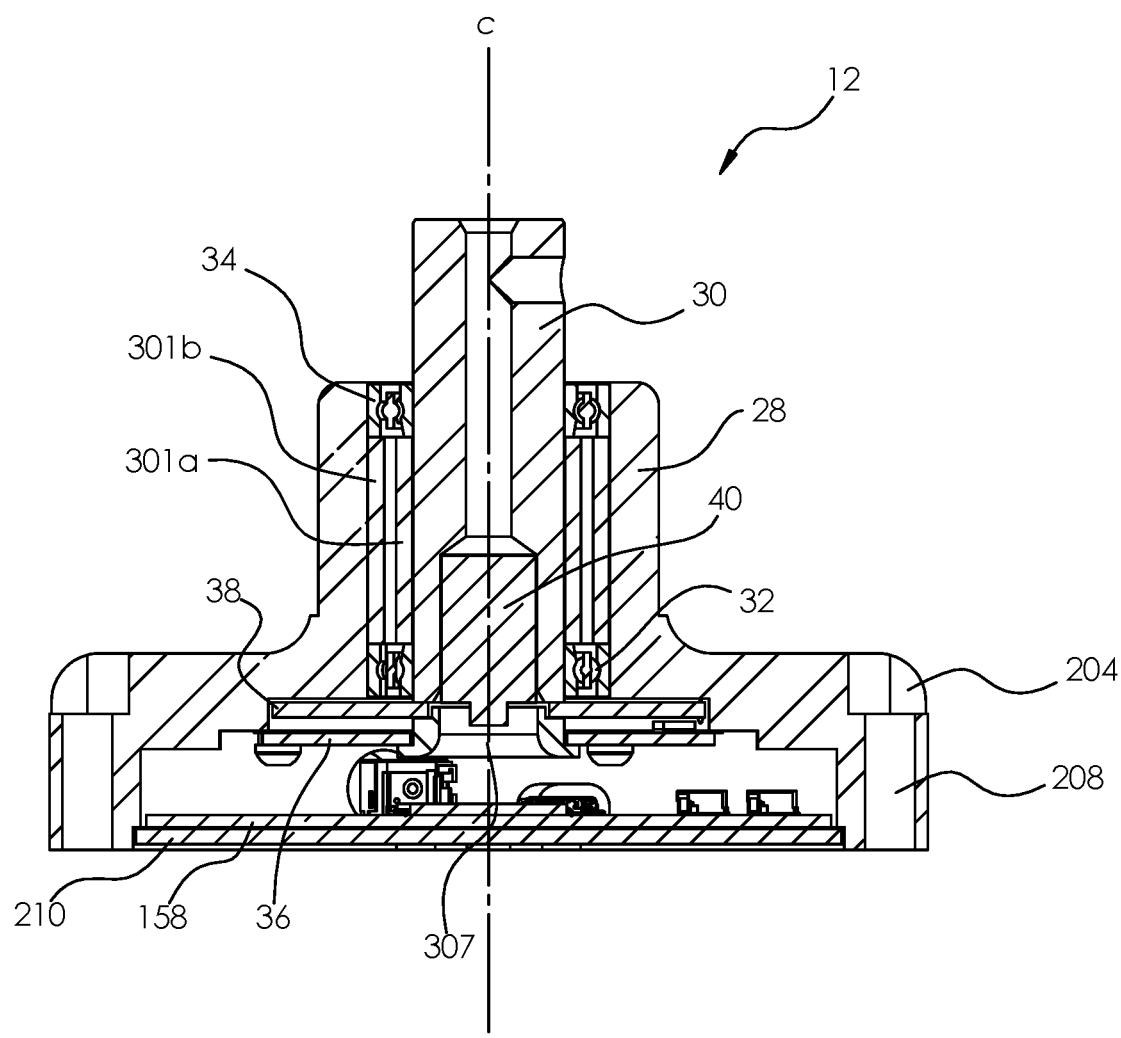
FIGS. 4A and 4B illustrate cross-sectional and partial exploded views, respectively, of an exemplary base and swivel joint of the CMM of FIGS. 1A-1D.
Figure 4B:
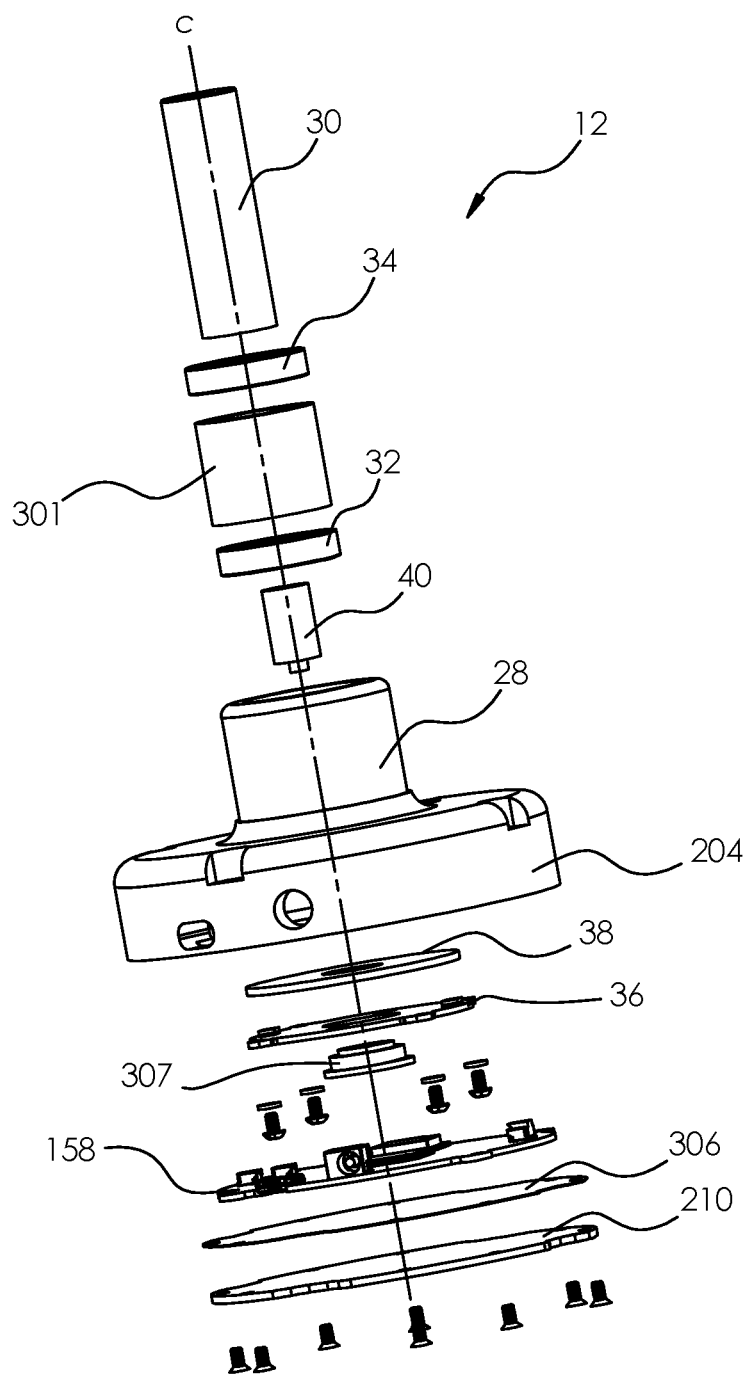

FIG. 4A and 4B illustrate a cross-sectional view and an exploded view of the exemplary joint 12 and base plate 204. The base plate 204 may have formed thereon holes 208 that receive fasteners for mounting the CMM 1 to a mounting surface or a magnet plate. The main PCB 158 may be disposed inside the base plate 204. The base plate 204 may have a cover plate 210 that attaches to the base plate 204 to cover the opening to the cavity within which the PCB 158 resides. The cover plate 210 may, for example, be fastened to the base plate 204 using screws 212. The main PCB may be mounted to the cover plate 210 or to the base plate 204 also using screws. An insulator 306 (e.g., Kapton Film) may be disposed between the PCB 158 and the cover plate 210.

The swivel joint 12 may include housing 28, shaft 30, bearings 32, 34, spacers 301a, 301b, encoder printed circuit board 36, encoder disk 38, and slip ring 40. The shaft 30 may have an internal opening 30a (e.g., 0.5" or 12.7 mm in diameter) that houses the slip ring 40. A plastic cap 307 is glued to encoder PCB 36 center hole to seal encoder cavity from dust contamination. As may be best seen in FIG. 4A, the housing 28 has a port that engages (e.g., fixedly attaches to) the outer diameters or outer races of the bearings 32, 34. The port of the housing 28 may, for example, be glued to the outer diameter or outer race of the bearings 32 and 34. The shaft 30, for its part, has an outer diameter that engages (e.g., is fixedly attached to) the inner diameter or inner race of the bearings 32, 34. The shaft 30 may, for example, be glued to the inner diameter or inner race of the bearings 32, 34. The shaft 30, therefore, rotates about the axis of rotation c of the bearings 32, 34 and the housing 28 of the hinge joint 12.

In the illustrated embodiment, the inner spacer 301a is a tubular spacer disposed abutting the inner race of the first bearing 32 and the inner race of the second bearing 34 while the outer spacer 301b is a tubular spacer disposed abutting the outer race of the first bearing 32 and an outer race of the second bearing 34. The spacers 301a and 301b are matched and precision lapped to maximize precision of the structure formed by the spacers 301a, 301b, and bearings 32, 34. The spacers 301a, 301b may be tubes fabricated of the same rigid yet relatively light material as shaft 30 including from carbon fiber, ceramic, or steel. Spacers 301a, 301b may be placed between the bearings 32, 34 to keep proper spacing between them and, more importantly, to set and preserve preload.

Similar to the swivel joints discussed above, the PCB 36 of the swivel joint 12 has installed thereon at least one transducer configured to output an angle signal corresponding to an angle of rotation of the shaft 30 relative to the housing 28 about the axis of rotation c. The encoder PCB 36 and the encoder disk 38 may be housed within the cavity of the base plate 204 parallel to the main PCB 158. This arrangement is particularly space-efficient and compact. The taller components on the main PCB 158 may be placed near the edges of the main PCB 158 (that do not vertically overlap the encoder PCB 36) where the height is larger.

Figure 5A:
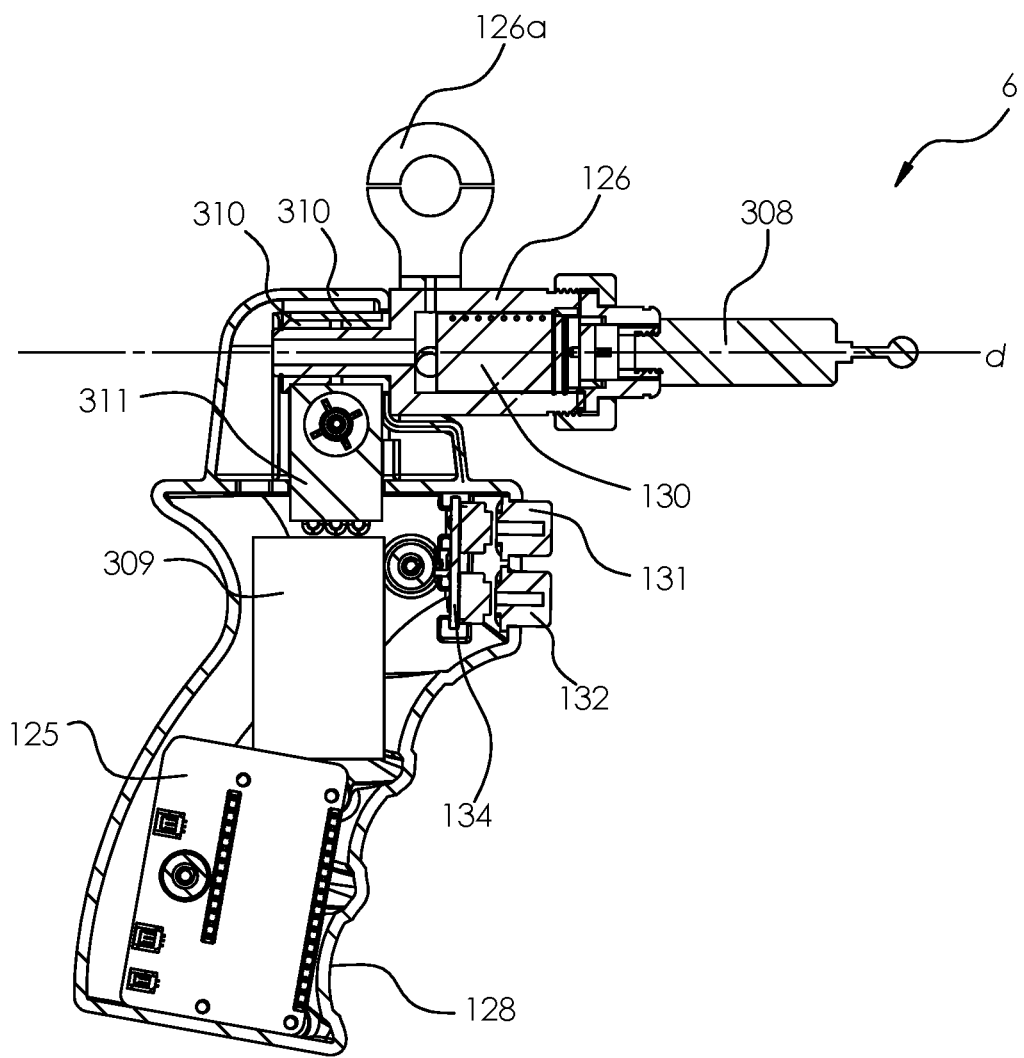
FIGS. 5A-5C illustrates cross-sectional and partial exploded views of an exemplary measurement probe of the CMM of FIGS. 1A-1D.
Figure 5B:
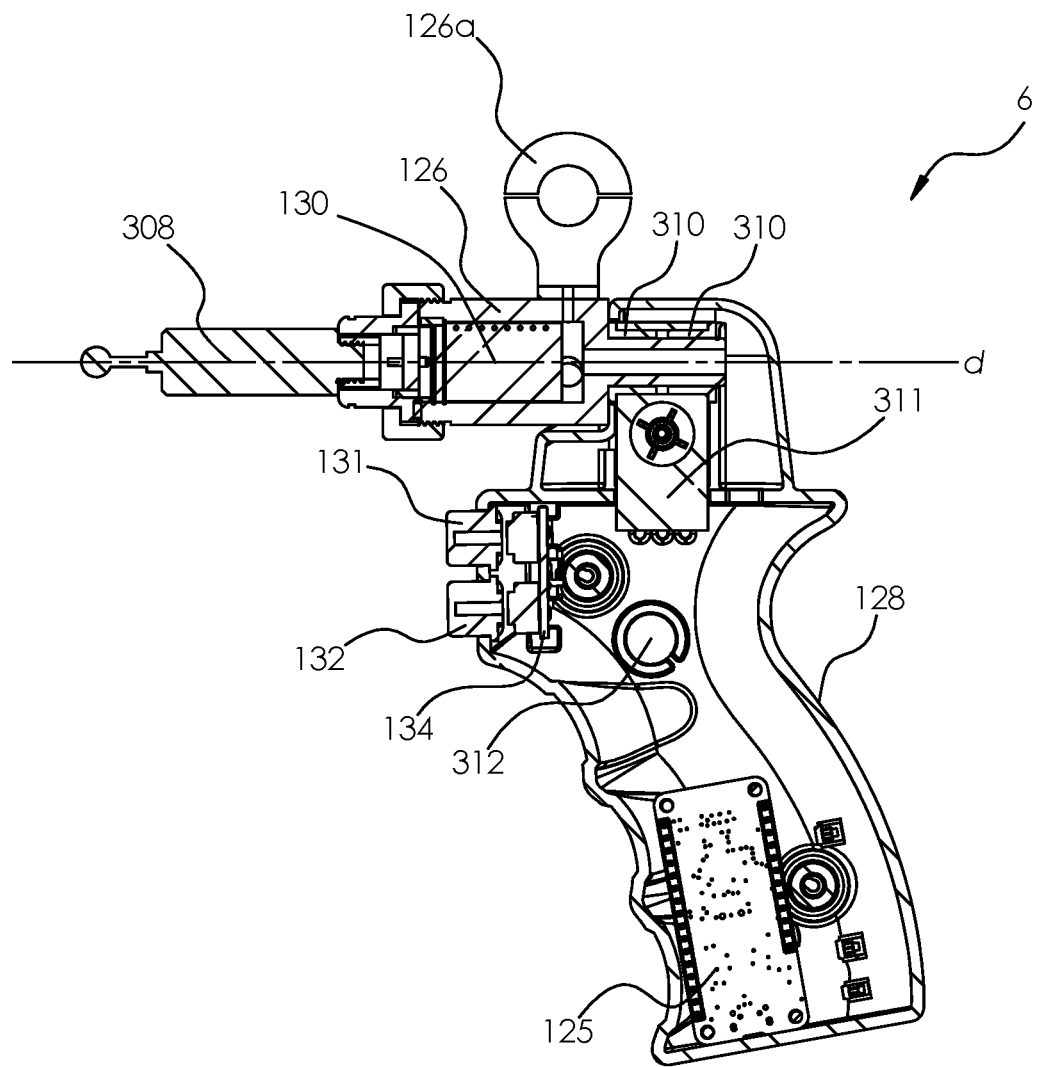
Figure 5C:
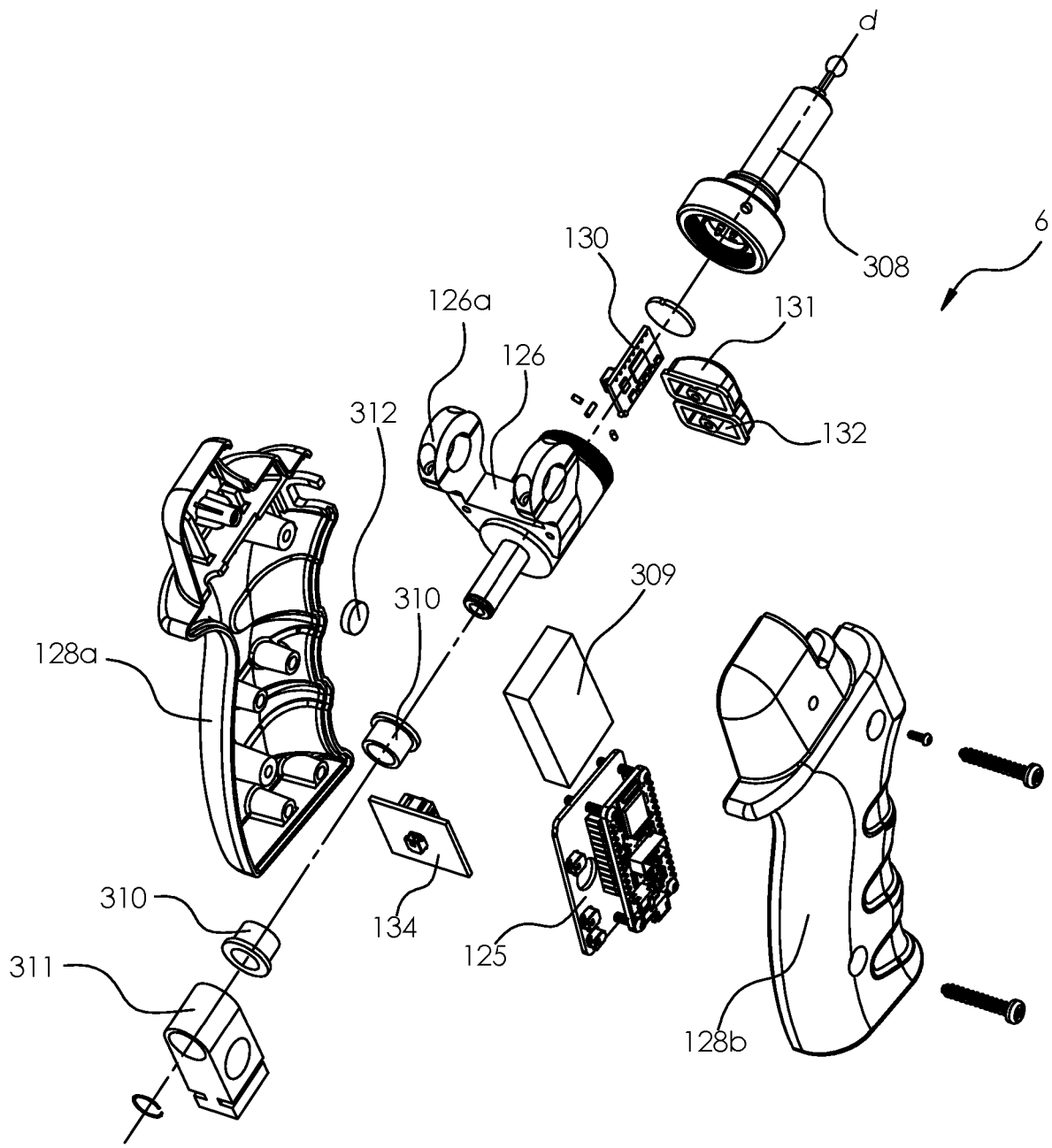

FIG. 5A-5C illustrate cross-sectional and exploded views of an exemplary measurement probe 6. Probe 6 includes a housing 126 that has an interior space for housing PCB 130 and a handle 128 (formed of two parts 128a and 128b) that has an interior space for housing PCB 125. Housing 126 operably couples to the hinge joint 22 (see FIGS. 1A-1D) by means of a yoke 126a.

The measurement probe 6 may also include a touch trigger probe 308 that mechanically connects to the housing 126 (e.g., screws on) and electrically connects to the PCB 130. The handle 128 may include two switches, namely a take switch 131 and a confirm switch 132. The operator may use these switches to take a measurement (take switch 131) and to confirm the measurement (confirm switch 132) during operation. The handle 128 is generally shaped to resemble a person's grip, which is more ergonomic than at least some prior art probes. The handle 128 may also house a switch PCB 134 to which the switches 131 and 132 may mount. Switch PCB 134 is electrically coupled to PCB 125 hosting components for processing signals from the switches 131 and 132. In one embodiment, the PCB 125 includes a wireless (e.g., Wi-Fi, Bluetooth, etc.) transmitter (instead of an electrical connection to the communication bus of the CMM 1) that wirelessly transmits take and confirm signals associated with the switches 131 and 132 to, for example, a host PC that generally controls the CMM 1. Wireless transmission of the take and confirm signals associated with the switches 131 and 132 significantly simplifies construction and wiring of the probe 6. The probe 6 may also include a battery 309 to power the electronics therein.

The handle 128 is attached to aluminum block 311 and incorporates two plastic bearings 310 which rotate around housing 126. A haptic feedback motor 312 is glued in handle 128 to provide feedback to the operator when taking a measurement.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities. In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted, or detected.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A coordinate measurement machine (CMM) comprising:
    a manually-positionable articulated arm having first and second ends, the articulated arm including a plurality of arm segments and a plurality of rotary joints including swivel joints and hinge joints, the first end including a connector configured to connect to a measurement probe and the second end including a base for mounting the CMM to a mounting surface;
    wherein at least one of the swivel joints of the plurality of rotary joints includes:
    first and second bearings;
    a shaft that is at least six inches long and that engages an inner race of the first bearing and an inner race of the second bearing, the shaft configured to rotate about an axis of rotation of the first bearing and the second bearing;
    a housing that engages an outer race of the first bearing;
    at least one transducer configured to output an angle signal corresponding to an angle of rotation of the shaft relative to the housing about the axis of rotation, the at least one transducer disposed adjacent one of the two ends of the shaft not between the first and second bearings; and
    a matched inner and outer tubular spacer set including an outer tubular spacer disposed abutting the outer race of the first bearing and an outer race of the second bearing, and an inner tubular spacer disposed abutting the inner race of the first bearing and the inner race of the second bearing, a majority of an outer surface of the outer tubular spacer being exposed as to represent an outermost layer of the at least one of the swivel joints.

2. The CMM of claim 1, the at least one of the swivel joints comprising:
    a second housing that engages an outer race of the second bearing, the second housing not directly connected to the first housing.

3. The CMM of claim 2, wherein each of the first housing and the second housing extends axially along a longitudinal axis parallel to the axis of rotation.

4. The CMM of claim 3, wherein axial length of each of the first housing and the second housing is such that the first housing and the second housing do not cover the majority of the outer surface of the outer tubular spacer.

5. The CMM of claim 4, wherein the first housing and the second housing are each adhesively coupled to the outer surface of the outer tubular spacer.

6. The CMM of claim 1, wherein the inner tubular spacer is adhesively coupled to the shaft.

7. The CMM of claim 1, wherein a majority of the outer surface of the outer spacer is exposed as to form a portion of a housing of the CMM.

8. A coordinate measurement machine (CMM) comprising:
    a manually-positionable articulated arm having first and second ends, the articulated arm including a plurality of arm segments and a plurality of rotary joints, the first end including a connector configured to connect to a measurement probe and the second end including a base for mounting the CMM to a mounting surface;
    wherein at least one of the rotary joints of the plurality of rotary joints is a swivel joint comprising:
    first and second bearings;
    a shaft that is at least six inches long and coupled to an inner race of the first bearing and an inner race of the second bearing to rotate about an axis of rotation of the first bearing and the second bearing;
    a housing that houses the first bearing;
    at least one transducer configured to output an angle signal corresponding to an angle of rotation of the shaft relative to the housing about the axis of rotation; and
    an outer spacer disposed abutting an outer race of the first bearing and an outer race of the second bearing, and an inner spacer disposed abutting the inner race of the first bearing and the inner race of the second bearing, a majority of an outer surface of the outer spacer being exposed as to form a portion of a housing of the CMM.

9. The CMM of claim 8, the swivel joint comprising:
    a second housing that houses the second bearing, the second housing not directly connected to the first housing.

10. The CMM of claim 9, wherein each of the first housing and the second housing extends axially along a longitudinal axis parallel to the axis of rotation.

11. The CMM of claim 10, wherein axial length of each of the first housing and the second housing is such that the first housing and the second housing do not cover the majority of the outer surface of the outer spacer.

12. The CMM of claim 10, wherein the first housing and the second housing are each adhesively coupled to the outer surface of the outer spacer.

13. The CMM of claim 8, wherein the inner spacer is adhesively coupled to the shaft.

14. The CMM of claim 8, a majority of the outer surface of the outer tubular spacer is exposed as to represent an outermost layer of the at least one of the swivel joints.

15. A coordinate measurement machine (CMM) comprising:

a manually-positionable articulated arm having first and second ends, the articulated arm including a plurality of arm segments and a plurality of rotary joints including swivel joints and hinge joints, the first end including a connector configured to connect to a measurement probe and the second end including a base for mounting the CMM to a mounting surface;

wherein at least one of the swivel joints of the plurality of rotary joints includes:

first and second bearings;

a shaft coupled to an inner race of the first bearing and an inner race of the second bearing to rotate about an axis of rotation of the first bearing and the second bearing;

a first housing coupled to an outer race of the first bearing and a second housing coupled to an outer race of the second bearing, the second housing not directly connected to the first housing;

at least one transducer configured to output an angle signal corresponding to an angle of rotation of the shaft relative to the first housing about the axis of rotation; and an inner spacer coupled to the inner race of the first bearing and the inner race of the second bearing and an outer spacer coupled to the outer race of the first bearing and the outer race of the second bearing, most of an outer surface of the outer spacer being exposed to form a portion of a housing of the CMM.

16. The CMM of claim 15, wherein each of the first housing and the second housing extends axially along a longitudinal axis parallel to the axis of rotation.

17. The CMM of claim 16, wherein axial length of each of the first housing and the second housing is such that the first housing and the second housing do not most of the outer surface of the outer spacer.

18. The CMM of claim 17, wherein the first housing and the second housing are each adhesively coupled to the outer surface of the outer spacer.

19. The CMM of claim 15, wherein the inner spacer is adhesively coupled to the shaft.

20. The CMM of claim 15, a majority of the outer surface of the outer tubular spacer is exposed as to represent an outermost layer of the at least one of the swivel joints.

* * * * *